G. A. SMITH.
PHOTOGRAPHIC EXPOSURE METER.
APPLICATION FILED AUG. 2, 1918.
1,310,255.
Patented July 15, 1919.
2 SHEETS—SHEET 1.
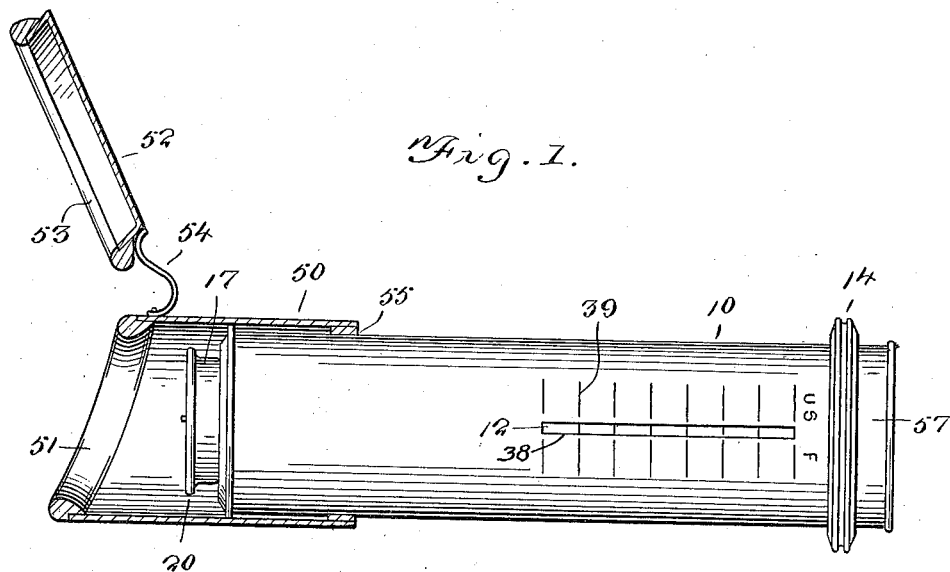
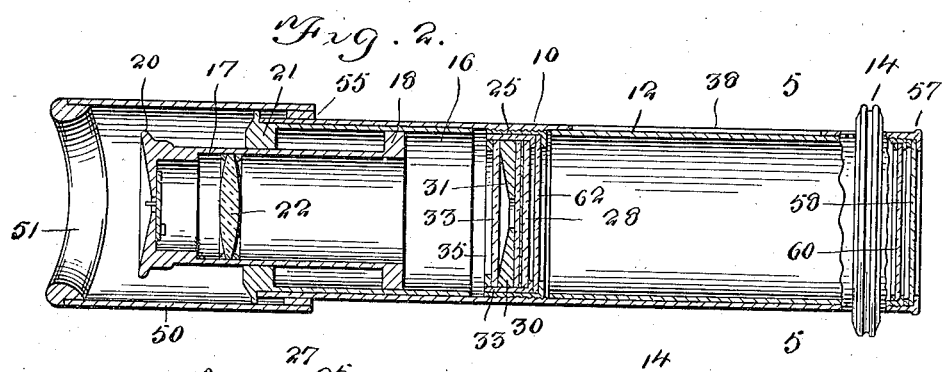
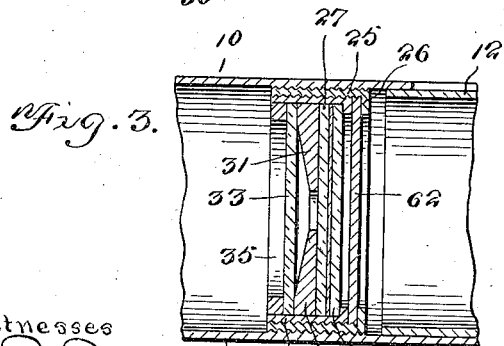
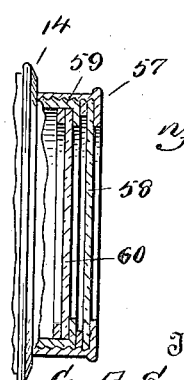
Witnesses
E. R. Ruppert
Inventor
G. A. Smith
By Victor J. Evans
Attorney

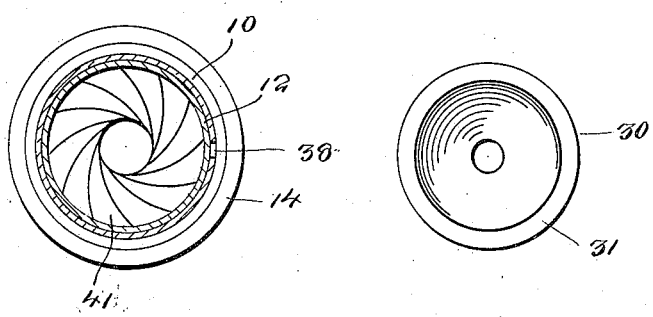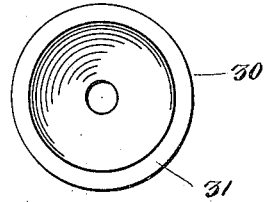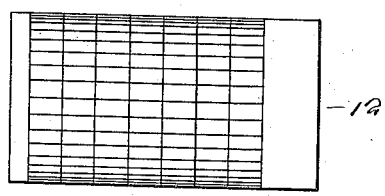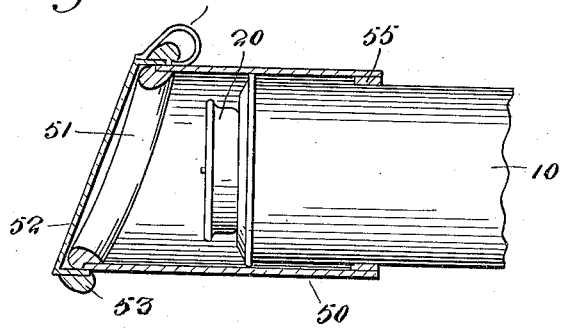

UNITED STATES PATENT OFFICE.

GEORGE A. SMITH, OF BALTIMORE, MARYLAND.

PHOTOGRAPHIC EXPOSURE-METER.

1,310,255.            Specification of Letters Patent.      Patented July 15, 1919.

Application filed August 2, 1918. Serial No. 248,006.

*To all whom it may concern:*

Be it known that I, GEORGE A. SMITH, a citizen of the United States, residing at Baltimore, in the county of Baltimore and State of Maryland, have invented new and useful Improvements in Photographic Exposure-Meters, of which the following is a specification.

The object of this invention is to provide a device for testing or measuring light in determining the correct exposure for taking photographs under various light conditions.

The invention consists in certain novel construction for carrying into effect the purpose of the invention above set forth.

In the drawings:—

Figure 1 is a view in elevation.

Fig. 2 is a longitudinal section.

Figs. 3 and 4 are details in section.

Figs. 5, 6 and 7 are details in elevation.

Fig. 8 is a detail of a device for excluding light and carried by the eye piece.

In carrying out my invention I provide a main tube 10, within which is mounted an inner tube 12, carrying on one end thereof, a rotatable member 14 adapted to be manipulated by hand in changing the position of the inner tube with reference to the elements referred to below.

Rotatable member 14 has a central bore or aperture admitting a given amount of light, and a series of such members 14 having apertures of different or graduated sizes may be employed in order to meet different conditions.

The opposite end of the tube 10 is provided with a telescoping section 16 slidable with reference to the tube 10, and within said element 16 is a second telescoping section 17 carrying a collar 18 at the end thereof engaging section 16. The eye piece is shown at 20 and a collar 21 is located at the end of the tubular member 10 and surrounds telescoping section 16. A lens 22 is mounted within telescoping section 17.

Within tubular member 10 is an annular member 25 provided with a flange 26, and within member 25 are a plurality of disks 27 and 28 of transparent material, these disks being colored or shaded if desired. A colored film may however be introduced between the transparent or translucent disks 27 and 28. A disk 30 is provided with a slightly inclined or beveled surface on one side thereof and with a thickened portion thereon near the outer edge. The beveled portion is coated with luminous material and disk 33 transparent or translucent material bears against the thickened edge portion 31 of disk 30, the element 33 being retained in position within annular member 25 by an annular member 35 threaded on its outer surface and constituting a type of washer. Disk member 30 is also threaded on its outer surface and engages annular member 25. By means of this construction all of the elements are retained in permanent position.

The tubular member 12 is provided with lines extending circumferentially thereof and with another series of lines extending longitudinally, as shown in Fig. 7. These lines are exposed through a longitudinal slot 38 in the tubular member 10, the member last named being provided with graduations 39 adjacent to the slot on the opposite sides thereof.

Within the rotatable member 14 are the elements 41 of the shutter of usual construction, and the degree of rotation imparted to member 14 determines the size of the light opening afforded by the shutter.

The instrument is operated in the following manner:

The eye piece is placed in position for sighting and the opposite end of the instrument, with the diaphgram opening, is directed toward the object of which a photograph is to be taken. The eye piece is adjusted by drawing it out or pushing it inwardly to bring the luminous disk exactly in focus or slightly out of focus whichever may be found by experience to be best. The disk operating the shutter 41 is then rotated first in one direction and then in the other, until the light passing through it and through the colored lenses or glass disks is of exactly the same intensity as the light thrown off by the luminous disk. This can readily be determined because the hole in the luminous disk will disappear and the rays will blend into one luminous circle.

If the light passing through the hole and the disk is brighter than the surface of the disk, it would be readily apparent, and the same would be true if it were not so bright. At only one point—that is when the light passing through the aperture is of exactly the same intensity as the surrounding disk— will they blend together.

The instrument is then taken from the eye and the designations which may be observed through the slot 38 in the casing, read in connection with the graduations on either side of the slot, will indicate the exposure required for the diaphragm openings of various cameras. The opposite sides of the slot are marked respectively U S and F, indicating uniform system and focal system.

A tubular member 50 surrounds the outer casing and the eye piece and is provided with a washer 55 for the purpose of effecting a suitable connection with said section of the eye piece. The outer end of element 50 is cutaway as shown and is provided with an annular flexible member 51 which may be formed of thin leather and rolled as shown. Any suitable packing material such as cotton may be inclosed within the rolled portion. A cap 52 is also provided with an annular rolled portion 53, these elements serving to exclude the light when the instrument is in position for sighting. The device 52 is connected by means of a flexible hinge member 54 with the tubular member 50 and this device 52 serves to exclude the light from one eye while the other eye is being used for taking an observation or measurement. In the absence of means for covering the other eye, some light would pass through the closed eyelid and make difficult an exactly true observation by the other eye.

The outer end of the casing is provided with a removable cap 57 in which is mounted a glass 58, this cap engaging the outer surface of the casing at the end thereof. An annular member 59 engages the inner surface of the casing at the end of the bore and serves to mount a glass 60.

These glasses 58 and 60 are suitably colored and if desired the outer glass may be somewhat darker than the other. A glass 62 is mounted in the casing in front of the glass 28 previously mentioned. Any of the glass disks or all of them may be provided with a ground surface in order to permit the rays of light to pass through without showing the outline of any object in the field of exposure. The glass 33 on that side of the luminous disk nearest the eye piece may have a ground surface permitting rays to pass through without showing inequalities of any character.

With the two glass disks 58 and 60 in position, a given amount of light will be permitted to pass through the diaphragm 41, and the adjustment of the latter from one extreme to the other will provide a given range of exposure. Upon removing disk 58, additional light is admitted, and the further adjustment of diaphragm 41 from one extreme to the other will very greatly increase the range of the instrument and its capacity for ascertaining the exposure required under different conditions and when a given amount of light is available.

I do not wish to limit myself to the exact construction shown and described, but may make such changes, alterations or additions as fall within the scope of the appended claims.

What is claimed is:—

1. In a device of the class described, a tubular casing, a tubular member rotatable therein, means for producing such rotation, a shutter controlled by said means, a telescoping eye piece for the tubular casing, a disk having a central aperture and a luminous surface mounted within the casing, and a disk located adjacent to the disk first named and serving to reduce the intensity of the light rays passing through the casing.

2. In a device of the class described, a casing, a tubular member rotatable therein, means for producing such rotation, a shutter controlled by said means, the tubular member being provided with a series of intersecting lines extending at an angle with each other, the casing being provided with a slot through which said lines are exposed, an eye piece mounted at one end of the tubular casing, a disk having a central aperture and a luminous surface mounted within the casing, said luminous surface being on the side toward the eye piece, and means for reducing the intensity of the light passing through the shutter and through the aperture of said disk.

3. In a device of the class described, a casing, an annular flanged member mounted therein at a point intermediate of the ends of the casing, a disk provided with a central aperture and with luminous surface on one side, said disk being mounted in the annular flanged member, means mounted in said member last mentioned adjacent to the luminous disk for reducing the intensity of the light rays, a telescoping eye piece mounted in one end of the casing, a shutter within said casing on the side of the luminous disk opposite to that on which the eye piece is located, means for adjusting the shutter, and means for determining the degree of adjustment thereof.

4. In a device of the class described, a tubular casing, a tubular member rotatable therein, means for producing such rotation, a shutter controlled by said means, a telescoping eye-piece for the casing, and a disk having a central aperture and a luminous surface, mounted within the casing, between the shutter and eye-piece, said luminous surface being on the side toward the eye-piece.

In testimony whereof I affix my signature.

GEORGE A. SMITH.

Copies of this patent may be obtained for five cents each, by addressing the "Commissioner of Patents, Washington, D. C."